J. R. MATHEWS.
HOSE CONNECTION FOR STEAM THAW POINTS.
APPLICATION FILED APR. 20, 1908.
914,151. Patented Mar. 2, 1909.
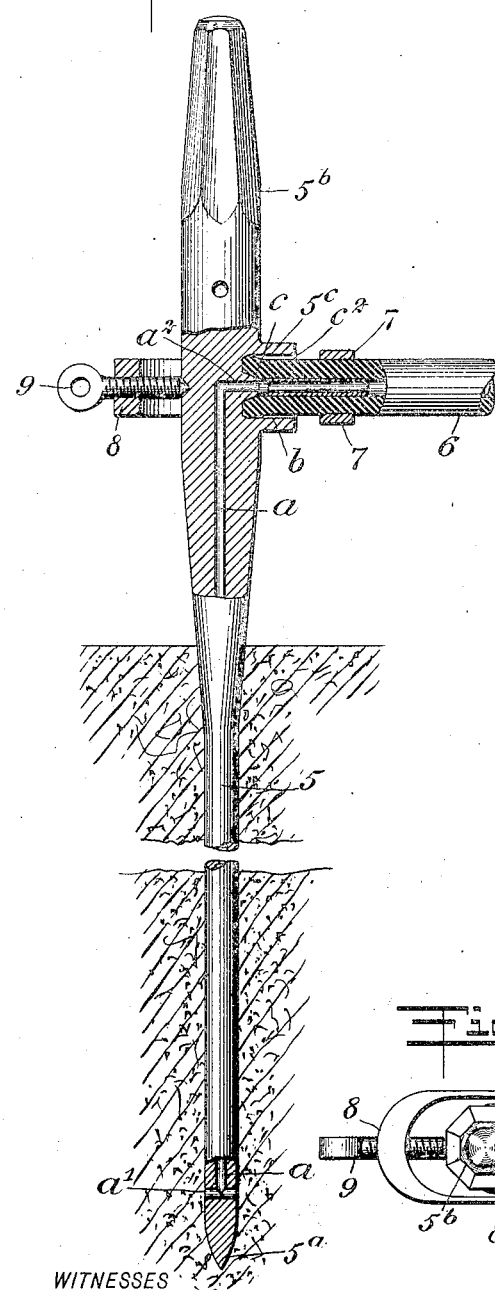
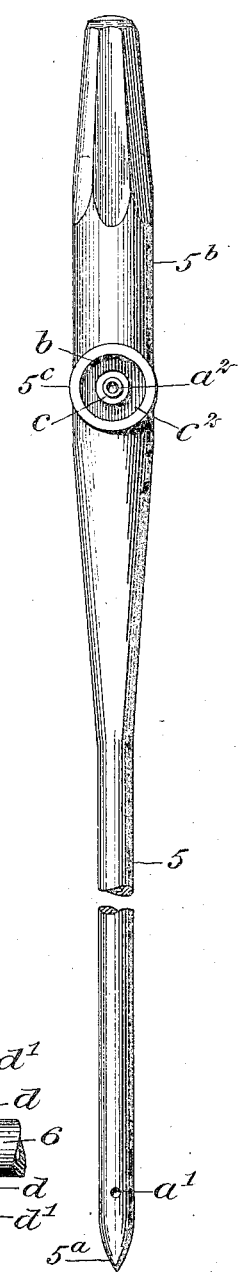
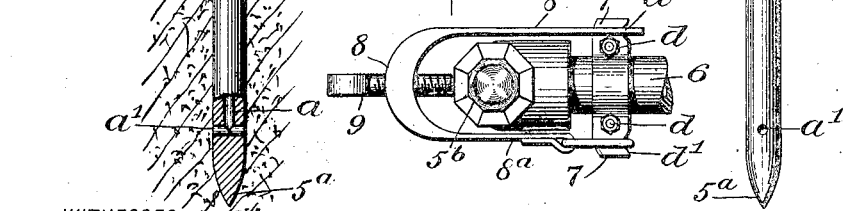
WITNESSES
INVENTOR
Joseph R. Mathews
BY
ATTORNEYS

UNITED STATES PATENT OFFICE.

JOSEPH ROBERT MATHEWS, OF FAIRBANKS, DISTRICT OF ALASKA.

HOSE CONNECTION FOR STEAM THAW-POINTS.

No. 914,151.  Specification of Letters Patent.  Patented March 2, 1909.

Application filed April 20, 1908. Serial No. 428,111.

*To all whom it may concern:*

Be it known that I, JOSEPH ROBERT MATHEWS, a citizen of the United States, and a resident of Fairbanks, District of Alaska, have invented a new and Improved Hose Connection for Steam Thaw-Points, of which the following is a full, clear, and exact description.

The purpose of this invention is to provide novel details of construction for hose connections, which enables the attachment in a simple and secure manner, of one end of a steam conducting hose upon the body of a thaw point, and which will not be affected by the jar incidental to driving the thaw point into frozen ground, that is to be thawed by steam passing down through said thaw point.

The invention consists in the novel construction and combination of parts as is hereinafter described and defined in the appended claims.

Reference is to be had to the accompanying drawings forming a part of this specification, in which similar characters of reference indicate corresponding parts in all the figures.

Figure 1 is a partly sectional and broken side view of a thaw point, and of a hose section secured by one end upon the head portion of the thaw point by means of the improved connection; Fig. 2 is a broken side elevation of the thaw point; and Fig. 3 is a partial plan view.

In the drawings, 5 indicates the body of a thaw point, preferably formed of steel, said body being cylindrical and having an axial bore $a$, of suitable diameter. The normally lower end of the body 5 terminates in a point $5^a$, and near said point the lower end of the bore $a$ is intersected by a transverse hole $a'$, that passes through the body of the thaw point. A sufficient length is given to the body 5 for its effective service, and at a point near the poll or head $5^b$, a diametrical enlargement and lateral branch $5^c$ of the body 5 is produced, to afford material wherein to form the improved hose connection.

As appears in Fig. 1, the axial bore $a$ is extended laterally at its upper end, thus producing an inlet perforation $a^2$, equal in diameter to that of the bore $a$. Concentric with the perforation $a^2$, an annular bore $b$ is formed in the enlargement and branch $5^c$ for a suitable depth, leaving a conical nipple $c$ intact with the body of the thaw point.

The diameter of the counterbore $b$ is such, that an annular recess $c^2$ is formed around the nipple $c$, of a size that permits the neat insertion of an end of a heavy pliable steam hose 6 therein, so that the true end of said hose will bear upon the bottom wall of the recess.

The preferred means for removably securing the end portion of the hose 6 in connection with the counterbored portion of the thaw point head, consists of the following details. Upon the hose 6, near its end, two clamping plates 7 are tightly clamped by the bolt and nuts $d$, said plates having notches $d'$ in their edges. A yoke, formed with a curved head or crown 8 and two parallel limbs $8^a$, is provided with hooks or other means for engaging the ends of the limbs with the notches $d'$ of the clamping plates 7 when the yoke is caused to embrace the body of the thaw point opposite the branch $5^c$. In the crown 8 of the yoke, a tapped perforation is formed, that receives the threaded body of an eye bolt 9, which by adjustment, will bear upon the body 5 and draw the hose forcibly against the bottom of the counterbore $b$.

It will be seen that the described means for connecting a steam hose with the head portion of a thaw point, affords a very strong and durable connection therefor, which will resist shock to which a hose coupling is subjected when the head of the thaw point is repeatedly struck with a sledge, for driving the point down into the frozen soil.

In case the hose 6 becomes worn out from use, or injured where it is joined to the thaw point, by continued bending at that point, it may be repaired quickly by first cutting it off at a solid part of the hose and then reconnecting the hose by means of the clamp as hereinbefore described.

Having thus described my invention, I claim as new and desire to secure a Letters Patent:

1. The combination with a thaw point body having an annular recess in one side thereof and a conical nipple disposed centrally in said recess, the thaw point body having a longitudinal bore and a lateral bore extending through the nipple and communicating with the longitudinal bore, of a hose section adapted to be inserted in the said recess and over the nipple, a clamping device clamped upon the hose section, and having projecting ends provided with notches, a yoke having limbs embracing the body of the thaw point, the said limbs being provided at their ends with hooks for engaging said notches, and adjustable means engaging the yoke and bearing on the thaw point body to draw the hose against the bottom of said recess.

2. The combination with a longitudinally perforated thaw point body, the perforation therein extending laterally near the upper end of the body, said body having a counterbored recess therein concentric with the lateral extension of the perforation, and a conical nipple formed on the bottom of the recess and around the perforation therein, of a steam hose section having an end thereof seated in the recess over the nipple, and a clamping device for holding the hose drawn into the recess, comprising two clamping plates secured upon the hose near the thaw point body, the said plates having notches in their edges, a yoke having parallel limbs extended from an integral crown member, said limbs embracing the body of the thaw point and provided at their ends with means for engagement with the notches of the clamping plates, and a screw bolt tapping the crown of the yoke and pressing at its end on the thaw point body at a point opposite the said nipple.

In testimony whereof I have signed my name to this specification in the presence of two subscribing witnesses.

JOSEPH ROBERT MATHEWS.

Witnesses:
J. H. KELLY,
GEO. PRESTON.